(12) United States Patent
Umezawa et al.

(10) Patent No.: US 9,349,404 B2
(45) Date of Patent: May 24, 2016

(54) PERPENDICULAR MAGNETIC RECORDING DISC

(75) Inventors: Teiichiro Umezawa, Singapore (SG); Kazuaki Sakamoto, Singapore (SG)

(73) Assignee: WD Media (Singapore) PTE. LTD, Singapore (SG)

( * ) Notice: Subject to any disclaimer, the term of this patent is extended or adjusted under 35 U.S.C. 154(b) by 383 days.

(21) Appl. No.: 13/149,613

(22) Filed: May 31, 2011

(65) Prior Publication Data

US 2012/0141833 A1  Jun. 7, 2012

(30) Foreign Application Priority Data

May 28, 2010 (JP) .................... 2010-122590

(51) Int. Cl.
G11B 5/66 (2006.01)
G11B 5/73 (2006.01)

(52) U.S. Cl.
CPC .................... G11B 5/7325 (2013.01)

(58) Field of Classification Search
None
See application file for complete search history.

(56) References Cited

U.S. PATENT DOCUMENTS

| | | | |
|---|---|---|---|
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |

(Continued)

FOREIGN PATENT DOCUMENTS

JP  2002-298326  10/2002
JP  2005-196898  7/2005

(Continued)

OTHER PUBLICATIONS

English Machine Translation: Kamimura (JP 2009-252308).*

(Continued)

*Primary Examiner* — Mark Ruthkosky
*Assistant Examiner* — Linda Chau

(57) ABSTRACT

[Problem] A perpendicular magnetic disk with an improved SNR and an increased recording density by further improving crystal orientation of a preliminary ground layer formed of an Ni-base alloy is provided.
[Solution] A typical structure of the perpendicular magnetic disk according to the present invention includes, on a base 110, a soft magnetic layer 130, a Ta alloy layer 140 provided on the soft magnetic layer 130, an Ni alloy layer 142 provided on the Ta alloy layer 140, a ground layer 150 provided on the Ni alloy layer 142 and having Ru as a main component, and a granular magnetic layer 160 provided on the ground layer 150. The Ta alloy layer 140 is a layer containing 10 atomic percent or more and 45 atomic percent or less Ta and having amorphous and soft magnetic properties.

7 Claims, 5 Drawing Sheets

(56) References Cited

U.S. PATENT DOCUMENTS

| | | |
|---|---|---|
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |

(56) References Cited

U.S. PATENT DOCUMENTS

| | | |
|---|---|---|
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B1 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,628,866 B2 * | 1/2014 | Singh et al. ............. 428/828.1 |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0129985 A1 * | 6/2005 | Oh et al. ............. 428/694 TS |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0177702 A1 * | 8/2006 | Ajan ............. 428/828.1 |
| 2006/0181697 A1 | 8/2006 | Treves et al. |
| 2006/0207890 A1 | 9/2006 | Staud |
| 2006/0275628 A1 * | 12/2006 | Chen et al. ............. 428/827 |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0130170 A1 * | 6/2008 | Shimizu et al. ............. 360/125.02 |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0296276 A1 * | 12/2009 | Shimizu ............. 360/125.03 |
| 2009/0311557 A1 | 12/2009 | Onoue et al. |
| 2010/0039724 A1 * | 2/2010 | Onoue et al. ............. 360/31 |
| 2010/0143752 A1 | 6/2010 | Ishibashi et al. |
| 2010/0188772 A1 * | 7/2010 | Sasaki et al. ............. 360/75 |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0233516 A1 * | 9/2010 | Kong et al. ............. 428/846.6 |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

FOREIGN PATENT DOCUMENTS

| | | |
|---|---|---|
| JP | 2005-310356 | 11/2005 |
| JP | 2007-179598 | 7/2007 |

(56) References Cited

FOREIGN PATENT DOCUMENTS

| | | |
|---|---|---|
| JP | 2008-123626 | 5/2008 |
| JP | 2009252308 A * | 10/2009 |
| WO | 2010038448 | 4/2010 |

OTHER PUBLICATIONS

Japanese Office Action dated May 27, 2014 for related Japanese Patent Application No. 2010-122590, 5 pages.

* cited by examiner

FIG. 2

| | CONCENTRATION OF Ta [at %] | Δθ50 OF GROUND LAYER | OW [dB] | SNR [dB] |
|---|---|---|---|---|
| COMPARATIVE EXAMPLE 1 | 5 | 2.67 | -38.3 | 16.5 |
| EXAMPLE 1 | 10 | 2.50 | -37.2 | 17.1 |
| EXAMPLE 2 | 15 | 2.42 | -35.8 | 17.4 |
| EXAMPLE 3 | 25 | 2.25 | -34.8 | 17.3 |
| EXAMPLE 4 | 40 | 2.11 | -34.3 | 17.1 |
| COMPARATIVE EXAMPLE 2 | 55 | 2.10 | -34.2 | 16.8 |

FIG. 3

| | COMPOSITION OF Ta ALLOY LAYER | OW [dB] | SNR [dB] |
|---|---|---|---|
| COMPARATIVE EXAMPLE 3 | Ta | -33.5 | 16.6 |
| EXAMPLE 5 | 90Co-10Ta | -34.6 | 17.0 |
| EXAMPLE 6 | 90(58Fe-42Ni)-10Ta(at%) | -35.2 | 17.2 |
| EXAMPLE 2 | 85(40Fe-60Co)-15Ta(at%) | -35.8 | 17.4 |

FIG. 4

| | CONCENTRATION OF Ta OF SOFT MAGNETIC LAYER [at %] | OW [dB] | SNR [dB] |
|---|---|---|---|
| EXAMPLE 7 | 0 | -36.6 | 17.1 |
| EXAMPLE 8 | 1 | -36.4 | 17.3 |
| EXAMPLE 9 | 3 | -36.2 | 17.5 |
| EXAMPLE 2 | 5 | -35.8 | 17.4 |
| EXAMPLE 10 | 7 | -35.5 | 16.8 |

FIG. 5

| | FILM THICKNESS OF Ta ALLOY LAYER [nm] | Δθ50 OF GROUND LAYER | OW [dB] | SNR [dB] |
|---|---|---|---|---|
| COMPARATIVE EXAMPLE 4 | 0 | 3.05 | -33.2 | 16.7 |
| EXAMPLE 11 | 1 | 2.63 | -34.8 | 17.2 |
| EXAMPLE 12 | 3 | 2.48 | -34.9 | 17.3 |
| EXAMPLE 2 | 6 | 2.42 | -35.8 | 17.4 |
| EXAMPLE 13 | 10 | 2.37 | -35.7 | 17.2 |
| EXAMPLE 14 | 13 | 2.36 | -35.7 | 16.9 |

PERPENDICULAR MAGNETIC RECORDING DISC

TECHNICAL FIELD

The present invention relates to a perpendicular magnetic disk implemented on an HDD (hard disk drive) of a perpendicular magnetic recording type or the like.

BACKGROUND ART

With an increase in capacity of information processing in recent years, various information recording technologies have been developed. In particular, the surface recording density of an HDD using magnetic recording technology is continuously increasing at an annual rate of approximately 60%. In recent years, an information recording capacity exceeding 320 gigabytes per platter has been desired for a magnetic recording medium with a 2.5-inch diameter for use in an HDD or the like. To fulfill such demands, an information recording density exceeding 500 gigabits per square inch is desired to be achieved.

Important factors for increasing recording density of the perpendicular magnetic disk include, for example, an improvement in TPI (Tracks per Inch) by narrowing the track width, ensuring electromagnetic conversion characteristics, such as a Signal-to-Noise Ratio (SNR) and an overwrite (OW) characteristic at the time of improving BPI (Bits per Inch), and further ensuring heat fluctuation resistance with recording bits decreased due to the above. Among these, an increase in SNR in a high recording density condition is important.

In a magnetic layer of a granular structure, which goes mainstream in recent years, a nonmagnetic substance having an oxide as a main component is segregated around magnetic particles having a CoCrPt alloy growing in a columnar shape to form a grain boundary part. In this structure, since the magnetic particles are separated from each other, noise is reduced, and this is effective for a high SNR. An important factor to further increase the SNR is to increase crystal orientation. Co takes an hcp structure (a hexagonal close-packed crystal lattice structure), and a c-axis direction (an axial direction of a hexagonal column as a crystal lattice) serves as an axis of easy magnetization. Therefore, by orienting the c axis of each of more crystals in a more perpendicular direction, noise is reduced and signals become strong, which can cause an increase in SNR as a synergy effect.

When a film of a metal with an hcp structure is formed by sputtering, crystal orientation tends to be improved as the film thickness is thicker. Thus, to enhance crystal orientation of a granular magnetic layer from an initial growth stage, conventionally performed are processes of forming a film of a ground layer made of Ru, which is a metal with an hcp structure, and then forming a film of the granular magnetic layer on the ground layer. Furthermore, a crystalline preliminary ground layer (which is also called a seed layer) is provided under the Ru ground layer, and crystal orientation of the Ru ground layer is improved.

Patent Document 1 discloses a structure in which a soft magnetic film forming a backing layer has an amorphous structure, a ground film (which corresponds to a preliminary ground layer in the present application) is made of a NiW alloy, and an intermediate film (which corresponds to a ground layer in the present application) is made of a Ru alloy. According to Patent Document 1, it is described that, with the ground film being made of a NiW alloy and the intermediate film being made of a Ru alloy, recording and reproduction of information can be made with high productivity and high density.

However, as a result of increasing a layer above the soft magnetic layer, when the film thickness is increased, a distance between the magnetic layer and the soft magnetic layer (hereinafter referred to as a "film thickness of the intermediate layer") is increased. With an increase of the film thickness of the intermediate layer, a distance between the soft magnetic layer and a head becomes longer, and the soft magnetic layer cannot sufficiently draw a write magnetic field outputted from the head. As a result, the overwrite characteristic (OW characteristic) of the medium is worsened, write signal quality is degraded and, in turn, read signal quality (SNR) is degraded.

To reduce degradation of the overwrite characteristic and the SNR, it has been studied that the soft magnetic layer is provided with the function of the preliminary ground layer to reduce the film thickness above the soft magnetic layer. In Patent Document 2, a technology is suggested in which an intermediate layer is made thinner by forming a seed layer (a preliminary ground layer) made of a soft magnetic material.

PRIOR ART DOCUMENTS

Patent Documents

Patent Document 1: Japanese Unexamined Patent Application Publication No. 2007-179598
Patent Document 2: Japanese Unexamined Patent Application Publication No. 2005-196898

DISCLOSURE OF INVENTION

Problems to be Solved by the Invention

For further increasing recording density in the future, the SNR is required to be further increased. As a measure for improving the SNR, a reduction of the film thickness of the intermediate layer can be thought. However, while the film thickness of the intermediate layer can be reduced in the structure of Patent Document 2, the SNR is not improved. The reason for this can be thought such that an improvement in crystal orientation is difficult in the preliminary ground layer having soft magnetic properties.

Thus, an object of the present invention is to provide a perpendicular magnetic disk for improving an SNR and increasing recording density by further improving crystal orientation of a preliminary ground layer formed of a Ni-base alloy.

Means for Solving the Problem

To solve the above problem, as a result of diligent studies about a preliminary ground layer with soft magnetic properties by the inventors of the present invention, the inventors found that when a CoFe alloy is used as a soft magnetic material of the preliminary ground layer, its surface tends to be rough, causing crystal orientation to be decreased. Thus, in order to reduce surface roughness of a film made of a soft magnetic material, further studies were conducted to complete the present invention.

That is, a typical structure of the perpendicular magnetic disk according to the present invention includes, on a base, a soft magnetic layer, a Ta alloy layer provided on the soft magnetic layer, an Ni alloy layer provided on the Ta alloy layer, a ground layer provided on the Ni alloy layer and having Ru as a main component, and a granular magnetic layer provided on the ground layer. The Ta alloy layer is a layer containing 10 atomic percent or more and 45 atomic percent or less Ta and having amorphous and soft magnetic properties.

The amorphous Ta alloy layer containing Ta in the above range ensures high amorphous properties, and allows a film with a flat surface to be formed. For this reason, crystal orientation of the film of the Ni alloy layer formed thereon can be improved. Also, with the Ta alloy layer having soft magnetic properties, the Ta alloy layer behaves as part of the soft magnetic layer, thereby reducing the film thickness of the intermediate layer. In other words, the film thickness of the intermediate layer is conventionally increased because the preliminary ground layer is used only for the purpose of crystal orientation, but, with the Ta alloy layer playing part of the role of the soft magnetic layer, the preliminary ground layer is not included in the film thickness of the intermediate layer. From these, it is possible to improve the SNR and increase recording density.

The Ta alloy layer is preferably formed by having Ta contained in a Fe—Co-base alloy, a FeNi-base alloy, or a Co-base alloy.

By having Ta in the above range contained in any of the alloys of any bases mentioned above, its surface can be planarized. Also, by using any of the alloys of these bases, the function of the soft magnetic layer and the function of the preliminary ground layer can both be achieved.

The soft magnetic layer is preferably a FeCo-base alloy containing 5 or less atomic percent Ta.

By using a FeCo-base alloy with a high saturation magnetization for the soft magnetic layer, AFC coupling (Antiferromagnetic exchange coupling) of the soft magnetic layer is reinforced, thereby obtaining a high Hex. When AFC coupling is weak, the magnetizing direction of the soft magnetic layer locally fluctuates to increase noise. On the other hand, when AFC coupling is strong, the direction of magnetization is firmly fixed and magnetization is completely cancelled in upper and lower soft magnetic layers to decrease noise due to the soft magnetic layer, resulting in an improvement in SNR.

That is, in the soft magnetic layer, large Ms is required to obtain a strong AFC coupling. However, only for the purpose of improving overwrite, Ms required is not so large. Therefore, high Ms is obtained with a small amount of Ta in the soft magnetic layer and high flatness is obtained at the cost of a decrease in Ms in the Ta alloy layer. As such, by separating the function of the soft magnetic layer and the function of the Ta alloy layer, saturation magnetization and flatness can both be achieved.

The Ta alloy layer preferably has a film thickness equal to or larger than 1 nm and equal to or smaller than 10 nm.

The reason for the above is that the effect of planarization cannot be obtained when the thickness is smaller than 1 nm. Also, when the thickness is larger than 10 nm, an improvement of the effect can no longer be found. When the thickness is increased further, AFC coupling of the soft magnetic layer is weakened and the track width is increased.

Effect of the Invention

According to the present invention, while an amorphous Ta alloy layer having soft magnetic properties plays part of the role of the soft magnetic layer, planarization is achieved to improve crystal orientation. With this, it is possible to increase the SNR while improving the overwrite characteristic.

BRIEF DESCRIPTION OF DRAWINGS

FIG. 2 A drawing for describing examples and comparative examples.

FIG. 3 A drawing for considering a magnetic material for a Ta alloy layer.

FIG. 4 A drawing for considering a concentration of Ta (not the Ta alloy layer) in a soft magnetic layer.

FIG. 5 A drawing for considering a film thickness of the Ta alloy layer.

BEST MODES FOR CARRYING OUT THE INVENTION

Figure 1:
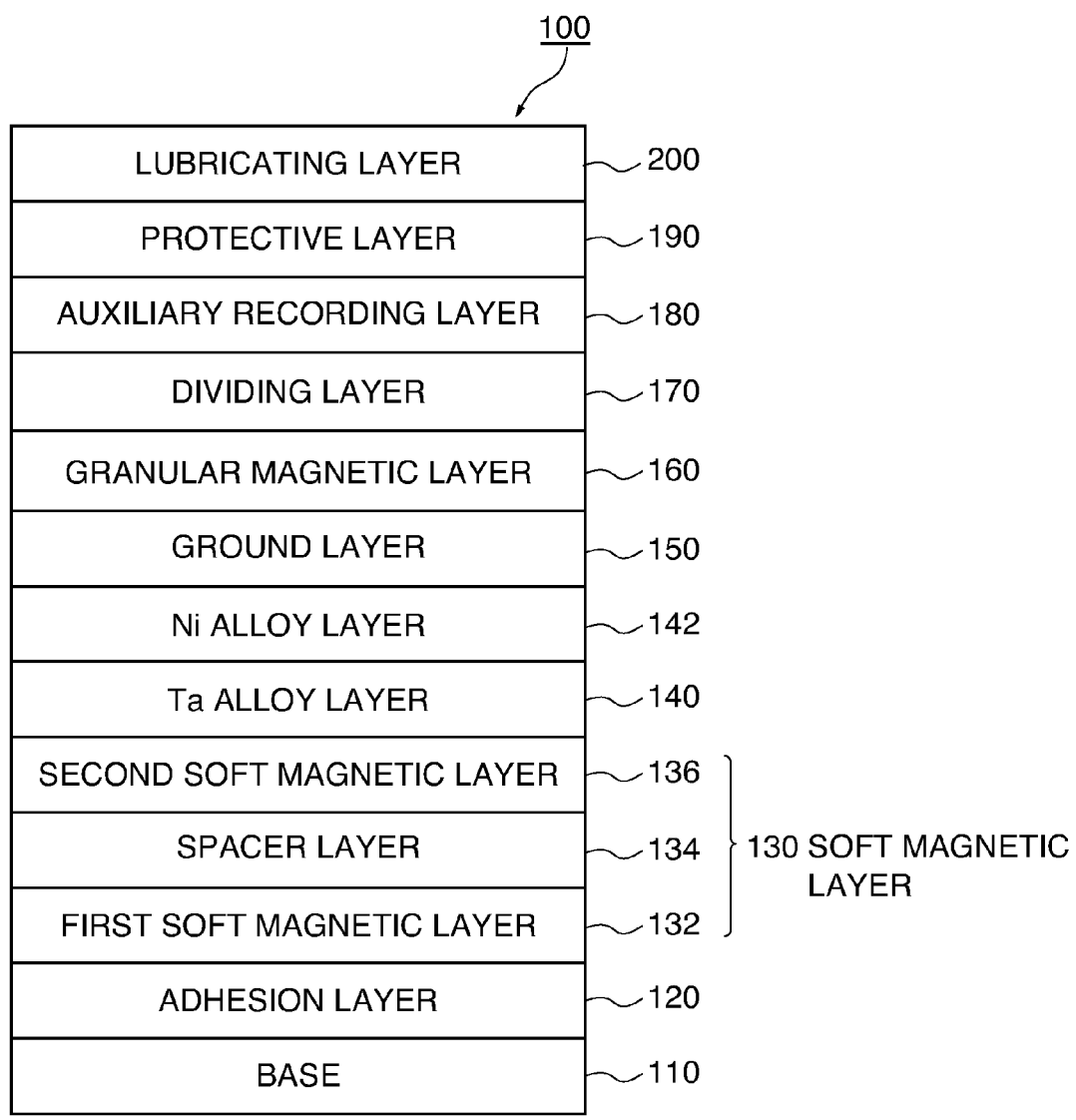
FIG. 1 A diagram for describing the structure of a perpendicular magnetic disk.

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference character and are not redundantly described, and components not directly relating to the present invention are not shown in the drawings.

(Perpendicular Magnetic Disk)

FIG. 1 is a diagram for describing the structure of a perpendicular magnetic disk 100 according to a first embodiment. The perpendicular magnetic disk 100 depicted in FIG. 1 is configured of a base 110, an adhesion layer 120, a soft magnetic layer 130 (a first soft magnetic layer 132, a spacer layer 134, and a second soft magnetic layer 136), a Ta alloy layer 140, a Ni alloy layer 142, a ground layer 150, a granular magnetic layer 160, a dividing layer 170, an auxiliary recording layer 180, a protective layer 190, and a lubricating layer 200.

As the base 110, for example, a glass disk obtained by molding amorphous aluminosilicate glass in a disk shape by direct pressing can be used. Note that the type, size, thickness, and others of the glass disk are not particularly restricted. Examples of a material of the glass disk include, for example, aluminosilicate glass, soda lime glass, soda aluminosilicate glass, aluminoborosilicate glass, borosilicate glass, quartz glass, chain silicate glass, and glass ceramic such as crystallized glass. By sequentially grinding, polishing, and then chemically strengthening any of these glass disks, the flat, nonmagnetic base 110 formed of a chemically-strengthen glass disk can be obtained.

On the base 110, films of the adhesion layer 120 to the auxiliary recording layer 180 are sequentially formed by DC magnetron sputtering, and a film of the protective layer 190 can be formed by CVD. Thereafter, the lubricating layer 200 can be formed by dip coating. The structure of each layer is described below.

The adhesion layer 120 is formed so as to be in contact with the base 110, and has a function of enhancing a close contact strength between the film of the soft magnetic layer 130 formed thereon and the base 110. The adhesion layer 120 is preferably an amorphous alloy film, such as a CrTi-base amorphous alloy, a CoW-base amorphous alloy, a CrW-base amorphous alloy, a CrTa-base amorphous alloy, or a CrNb-base amorphous alloy. The adhesion layer 120 can have a film thickness, for example, on the order of 2 nm to 20 nm. The adhesion layer 120 may be a single layer, and may be formed by laminating a plurality of layers.

The soft magnetic layer 130 functions as helping facilitate writing of a signal in the magnetic recording layer and increase density by convergence of a write magnetic field from the head when a signal is recorded by a perpendicular magnetic recording scheme. The soft magnetic layer 130 has the thin-film spacer layer 134 made of Ru interposed between the first soft magnetic layer 132 disposed on a base 110 side and the second soft magnetic layer 136 disposed on a front surface side. With this structure, AFC coupling is formed between the first soft magnetic layer 132 and the second soft magnetic layer 136. With this, perpendicular components of magnetization can be extremely lessened, and therefore noise occurring from the soft magnetic layer 130 can be reduced. In the case of the structure in which the spacer layer 134 is involved, the film thickness of the soft magnetic layer 130 can be such that the spacer layer has a film thickness on the order of 0.3 nm to 0.9 nm and layers thereabove and therebelow made of a soft magnetic material each have a film thickness on the order of 10 nm to 50 nm.

As a soft magnetic material, a FeCo-base alloy containing 5 atomic percent or less Ta is preferable. By using a FeCo-base alloy with a high saturation magnetization Ms as the soft magnetic layer, AFC coupling (Antiferro-magnetic exchange coupling) is reinforced, thereby obtaining a high Hex. Here, if Ta concentration is increased, Ms is abruptly decreased, AFC coupling is lost, and noise from the soft magnetic layer is increased.

The Ta alloy layer 140 is a layer provided on the soft magnetic layer 130 and having amorphous and soft magnetic properties containing 10 atomic percent or more and 45 atomic percent or less Ta. The amorphous Ta alloy layer 140 containing Ta in the above range ensures high amorphous properties and allows a film with a flat surface to be formed. Ta has a function of enhancing amorphous properties and allows a film with an extremely flat surface to be formed. Thus, crystal orientation of the film of the Ni alloy layer 142 formed thereon can be improved.

Also, with the Ta alloy layer 140 having soft magnetic properties, the Ta alloy layer behaves as part of the soft magnetic layer to reduce a spacing loss. In other words, the film thickness of the intermediate layer is conventionally large because the preliminary ground layer is used only for the purpose of crystal orientation, but, with the Ta alloy layer playing part of the role of the soft magnetic layer, the preliminary ground layer is not included in the film thickness of the intermediate layer. From these, it is possible to improve the SNR and increase recording density.

The composition of the Ta alloy layer is preferably formed by having Ta contained in a FeCo-base alloy, a Fe—Ni-base alloy, or a Co-base alloy. By having 10 atomic percent or more and 45 atomic percent or less Ta contained in any of the alloys of any bases mentioned above, the layer can be promoted to be made amorphous and its surface can be planarized. Also, by using any of the alloys of these bases, the function of the soft magnetic layer 130 and the function of the preliminary ground layer can both be achieved.

The Ta alloy layer 140 preferably has a film thickness equal to or larger than 1 nm and equal to or smaller than 10 nm. The reason for the above is that the effect of planarization cannot be obtained when the thickness is smaller than 1 nm. Also, when the thickness is larger than 10 nm, an improvement of the effect can no longer be found. When the thickness is increased further, AFC coupling of the soft magnetic layer 130 is weakened and noise is increased.

The Ni alloy layer 142 has a function of promoting crystal orientation of the ground layer 150 formed thereabove and a function of controlling a microfabricated structure, such as a particle diameter. The Ni alloy layer 142 is formed of an Ni-base alloy with a fcc crystal structure (a face-centered cubic structure) and is oriented in a manner such that a (111) surface is parallel to a main surface of the base 110. An example of a material of the Ni alloy layer 142 can be an alloy having Ni as a main component and having added thereto one or more of V, Cr, Mo, W, Ta, and others. Specifically, a selection can be suitably made from NiV, NiCr, NiTa, NiW, NiVCr, and others. Note that the main component is a component that is contained most. The Ni alloy layer 142 can have a film thickness on the order of 1 nm to 20 nm.

Here, crystal orientation can be improved more by forming a film of the Ni alloy layer 142 after forming a film of the Ta alloy layer 140 on the soft magnetic layer 130 than by directly forming a film of the Ni alloy layer 142 on the soft magnetic layer 130. As described above, large saturation magnetization Ms can be obtained with the soft magnetic properties of the Fe—Co-base alloy containing 5 atomic percent or less Ta, but surface roughness is large. On the other hand, in the Ta alloy layer 140 containing 10 atomic percent or more and 45 atomic percent or less Ta, since the layer is prompted to be made amorphous to cause its surface to be planarized, the crystal of the Ni alloy layer 142 finely grows, thereby improving crystal orientation.

Note that in the soft magnetic layer 130, large Ms is required to obtain a strong AFC coupling. However, only for the purpose of improving the overwrite characteristic, Ms required is not so large. Therefore, high Ms is obtained with a small amount of Ta in the soft magnetic layer 130 and high flatness is obtained with an increased amount of Ta at the cost of a decrease in Ms in the Ta alloy layer 140. As such, by separating the function of the soft magnetic layer 130 and the function of the Ta alloy layer 140, strong AFC coupling and high flatness (crystal orientation) can both be achieved.

The ground layer 150 is a layer having an hcp structure, having a function of promoting crystal orientation of magnetic crystal particles in the hcp structure of the granular magnetic layer 160 formed thereabove and a function of controlling microfabricated structure, such as a particle diameter, and serving as a so-called basis of a granular structure. Ru has an hcp structure as that of Co, and a lattice space of the crystal is similar to that of Co. Therefore, magnetic particles having Co as a main component can be oriented in good condition. Therefore, as crystal orientation of the ground layer 150 is higher, crystal orientation of the granular magnetic layer 160 can be improved. Also, by microfabricating the particle diameter of the ground layer 150, the particle diameter of the granular magnetic layer can be microfabricated. While a typical material of the ground layer 150 is Ru, a metal, such as Cr or Co, or an oxide can further be added. The ground layer 150 can have a film thickness of, for example, on the order of 5 nm to 40 nm.

Also, by changing gas pressure at the time of sputtering, the ground layer 150 may be formed in a two-layer structure. Specifically, if Ar gas pressure is increased in the case of forming an upper layer side of the ground layer 150 compared with the case of forming a lower layer side, the particle diameter of the magnetic particles can be microfabricated while crystal orientation of the upper granular magnetic layer 160 is kept in good condition.

The granular magnetic layer 160 has a granular structure in a columnar shape in which a nonmagnetic substance having an oxide as a main component is segregated around the magnetic particles with ferromagnetic properties having a Co—Pt-base alloy as a main component to form a grain boundary. For example, by forming a film with the use of a target obtained by mixing SiO2, TiO2, or the like in a CoCrPt-base alloy, SiO2 or TiO2, which is a nonmagnetic substance, is segregated around the magnetic particles (grains) formed of a CoCrPt-base alloy to form a grain boundary, and a granular structure with the magnetic particles growing in a columnar shape can be formed.

Note that the substance for use in the granular magnetic layer 160 described above is merely an example, and is not restrictive. As a CoCrPt-base alloy, one or more types of B, Ta, Cu, Ru, and others may be added to CoCrPt. Also, examples of a nonmagnetic substance for forming a grain boundary can include oxides, such as silicon oxide (SiO2), titanium oxide (TiO2), chrome oxide (Cr2O3), zircon oxide (ZrO2), tantalum oxide (Ta2O5), cobalt oxide (CoO or Co3O4). Also, not only one type of oxide but also two or more types of oxide can be combined for use.

The dividing layer 170 is provided between the granular magnetic layer 160 and the auxiliary recording layer 180, and has an action of adjusting the strength of exchange coupling between these layers. With this, the strength of a magnetic interaction acting between the granular magnetic layer 160 and the auxiliary recording layer 180 and between adjacent magnetic particles in the granular magnetic layer 160 can be adjusted. With this, while magnetostatic values, such as Hc and Hn, relating to heat fluctuation resistance are kept, recording and reproduction characteristics, such as an overwrite characteristic and an SNR characteristic, can be improved.

The dividing layer 170 is preferably a layer having an hcp crystal structure and having Ru or Co as a main component so as not to decrease inheritance of crystal orientation. As a Ru-base material, in addition to Ru, a material obtained by adding another metal, oxygen, or an oxide to Ru can be used. Also, as a Co-base material, a CoCr alloy or the like can be used. Specific examples include Ru, RuCr, RuCo, Ru—SiO2, Ru—WO3, Ru—TiO2, CoCr, CoCr—SiO2, CoCr—TiO2, or the like can be used. Note that a nonmagnetic material is normally used for the dividing layer 170, but the dividing layer 170 may have low magnetic properties. Furthermore, in order to obtain excellent exchange coupling strength, the dividing layer 170 may preferably have a film thickness within 0.2 nm to 1.0 nm.

Still further, the dividing layer 170 has an action to the structure to promote separation of the crystal particles of the upper auxiliary recording layer 180. For example, even when the upper layer is made of a material not containing a nonmagnetic substance, such as an oxide, the grain boundary of the magnetic crystal particles can be clarified.

The auxiliary recording layer 180 is a magnetic layer magnetically approximately continuous in an in-plane direction of a main surface of the base. Since the auxiliary recording layer 180 has a magnetic interaction (exchange coupling) with respect to the granular magnetic layer 160, magnetostatic characteristics, such as a coercive force Hc and an inverted-magnetic-domain nucleation magnetic field Hn, can be adjusted. With this, an object is to improve heat fluctuation resistance, an overwrite characteristic, and an SNR. As a material of the auxiliary recording layer 180, a CoCrPT alloy can be used and, furthermore, an additive, such as B, Ta, Cu, Ru, or the like, may be added. Specifically, CoCrPt, CoCrPtB, CoCrPtTa, CoCrPtCu, CoCrPtCuB, and others can be used. Furthermore, the auxiliary recording layer 180 can have a film thickness of, for example, 3 nm to 10 nm.

Note that "magnetically continuous" means that magnetic properties continue without interruption. "approximately continuous" means that the auxiliary recording layer 180 is not necessarily a single magnet when observed as a whole but the magnetic properties may be partially discontinuous. That is, the auxiliary recording layer 180 can have magnetic properties across (so as to cover) a collective body of a plurality of magnetic particles. As long as this condition is satisfied, the auxiliary recording layer 180 may have a structure in which, for example, Cr is segregated.

The protective layer 190 is a layer for protecting the perpendicular magnetic disk 100 from a shock from the magnetic head. The protective layer 190 can be formed by forming a film containing carbon by CVD. In general, a carbon film formed by CVD has an improved film hardness compared with a film formed by sputtering, and therefore is suitable because it can more effectively protect the perpendicular magnetic disk 100 from a shock from the magnetic head. The protective layer 190 can have a film thickness of, for example, 2 nm to 6 nm.

The lubricating layer 200 is formed so as to prevent damage on the protective layer 190 when the magnetic head makes contact with the surface of the perpendicular magnetic disk 100. For example, a film can be formed by applying PFPE (perfluoropolyether) by dip coating. The lubricating layer 200 can have a film thickness of, for example, 0.5 nm to 2.0 nm.

First Example

To confirm effectiveness of the above-structured perpendicular magnetic disk 100, the following examples and comparative examples are used for description.

As an example, on the base 110, by using a vacuumed film forming device, films of the adhesion layer 120 to the auxiliary recording layer 132 were sequentially formed in an Ar atmosphere by DC magnetron sputtering. Note that the Ar gas pressure at the time of film formation is 0.6 Pa unless otherwise specified. For the adhesion layer 120, a film was formed of Cr-50Ti so as to have 10 nm. For the first soft magnetic layer 132, a film was formed of 92(40Fe-60Co)-3Ta-5Zr so as to have 18 nm. For the spacer layer 134, a film was formed of Ru so as to have 0.7 nm. For the second soft magnetic layer 136, a film was formed so as to have a composition identical to that of the first soft magnetic layer 132 and have 15 nm. As the Ta alloy layer 140, a film was formed by using 40Fe-60Co-base alloy containing Ta so as to have 6 nm. For the Ni alloy layer 142, a film was formed of Ni-5W so as to have 8 nm. For the ground layer 150, a film was formed of Ru at 0.6 Pa so as to have 10 nm and then a film was formed of Ru at 5 Pa so as to have 10 nm. For the granular magnetic layer 160, a film was formed of 90(70Co-10Cr-20Pt)-10(Cr2O3) at 3 Pa so as to have 2 nm and then a film was formed thereon of 90(72Co-10Cr-18Pt)-5(SiO2)-5(TiO2) at 3 Pa so as to have 12 nm. For the dividing layer 170, a film was formed of Ru so as to have 0.3 nm. For the auxiliary recording layer 180, a film was formed of 62Co-18Cr-15Pt-5B so as to have 6 nm. For the protective layer 190, a film was formed by using C2H4 by CVD so as to have 4.0 nm, and then its surface layer was nitrided. The lubricating layer 200 was formed by using PFPE by dip coating so as to have 1 nm.

FIG. 2 is a drawing for describing the examples and the comparative examples. In both of the comparative examples and the examples, a 40Fe-60Co-base alloy containing Ta is used, and the concentration of Ta is increased or decreased. The concentration of Ta is increased or decreased with a ratio between Fe and Co being kept. For example, 95(40Fe-60Co)-5Ta is used in a first comparative example, 90(40Fe-60Co)-10Ta is used in a first example. Similarly, the concentrations of Ta in a second example, a third example, a fourth example, and a second comparative example are 15 atomic percent, 25 atomic percent, 40 atomic percent, and 55 atomic percent, respectively.

In FIG. 2, Δθ50 of the ground layer is crystal orientation of a Ru crystal measured by a locking curve method by using an X-ray diffraction device. This value indicates orientation distribution (a c-axis angle of divergence) representing the magnitude of variability of orientation of a crystalline, and a smaller value indicates better orientation. With reference to FIG. 2, it can be found that as the concentration of Ta increases, Δθ50 decreases to increase crystal orientation. The reason for this can be thought such that as the concentration of Ta increase, flatness of its surface increases to improve crystal orientation of the film of the Ni alloy layer 142 and others formed after the Ta alloy layer 140 is formed.

In FIG. 2, each OW was obtained by measuring an overwrite characteristic (ease of write) with the perpendicular magnetic disk 100 being completed after formation of films of the granular magnetic layer 160 and others. With reference to FIG. 2, it can be found that as the concentration of Ta increases, the overwrite characteristic decreases. Note that a slight saturation tendency can be seen in Δθ50 at 40 atomic percent and more, and a saturation tendency can be seen in the overwrite characteristic near 25 atomic percent. The overwrite characteristic decreases according to the concentration of Ta because the magnetic properties of the Ta alloy layer are weakened.

In FIG. 2, each SNR was obtained by measuring an SNR with the perpendicular magnetic disk 100 being completed after formation of films of the granular magnetic layer 160 and others. A significant improvement can be seen from 5 atomic percent in the first comparative example to 10 atomic percent in the first example. However, with a peak of 15 atomic percent in the second example, the value gradually decreases, and significantly decreases at 55 atomic percent in the second comparative example. The SNR decreases as Ta exceeds 5 atomic percent, and the reason for this can be thought such that the magnetic properties of the Ta alloy layer 140 are weakened to cause the function as part of the soft magnetic layer to be lost. It can also be thought that crystal orientation is degraded with 5 atomic percent or less Ta and noise of the magnetic layer increases, thereby decreasing the SNR.

In consideration of the results above, it can be found that the concentration of Ta is preferably equal to or larger than 10 atomic percent and equal to or smaller than 45 atomic percent. That is, at 5 atomic percent in the first comparative example, the effect of characteristic improvement is small for both of Δθ50 and SNR. On the other hand, at 55 atomic percent in the second comparative example, the SNR and the overwrite characteristic are decreased. With the concentration of Ta being in the above range, it is possible to cause the Ta alloy layer 140 to function as part of the soft magnetic layer 130 to decrease the film thickness of an intermediate layer, and improve crystal orientation of layers above the Ni alloy layer 142 to increase the SNR.

FIG. 3 is a drawing for considering a magnetic material for the Ta alloy layer. Only Ta is used in a third comparative example, 90Co-10Ta is used as an example of a Co-base alloy in a fifth example, 90(68Fe-42Ni)-10Ta is used as an example of a FeNi-base alloy in a sixth example, and 85(40Fe-60Co)-15Ta is used as an example of a FeCo-base alloy in the second example.

With reference to FIG. 3, in the third comparative example using nonmagnetic Ta, both of the overwrite characteristic and SNR are lower than those in the fifth, sixth, and second examples. The reason for this can be thought such that, in the structure of the third comparative example, the Ta alloy layer does not have a function as part of the soft magnetic layer, and therefore the film thickness of the intermediate layer is increased. On the other hand, as the results of the fifth, sixth, and second examples, it has been confirmed that both of the function of the soft magnetic layer and the function of the preliminary ground layer can be achieved in any of the alloys of any bases mentioned above.

FIG. 4 is a drawing for considering the concentration of Ta (not the Ta alloy layer) in the soft magnetic layer. The composition of the soft magnetic layer 130 is assumed to be (95-X)(40Fe-60Co)-5Zr—X(Ta), and the concentration of Ta is increased or decreased with a ratio between Fe and Co being kept. Ta is not contained in a seventh example, 1 atomic percent Ta is contained in an eighth example, 3 atomic percent Ta is contained in a ninth example, 5 atomic percent Ta is contained in a second example, 7 atomic percent Ta is contained in a tenth example. Note that the structure of the Ta alloy layer 140 at this time is assumed to be similar to that of the second example.

With reference to FIG. 4, it can be found that as the concentration of Ta contained in the soft magnetic layer is increased, both of the overwrite characteristic and SNR are decreased. The reason for this is such that even in a FeCo-base alloy with high saturation magnetization Ms, as the concentration of Ta is increased, Ms is decreased to weaken AFC coupling and increase noise. In the tenth example containing 7 atomic percent Ta, the SNR is approximately equal to that in the second comparative example shown in FIG. 2. From this, it can be found that Ta contained in the soft magnetic layer 130 is preferably at 5 atomic percent or smaller. Note that, to achieve the effect of the Ta alloy layer 140, it is not required to have Ta contained in the soft magnetic layer 130 (Ta in the soft magnetic layer 130 may be at 0 atomic percent).

FIG. 5 is a drawing for considering a film thickness of the Ta alloy layer. No film of the Ta alloy layer 140 is not formed in a fourth comparative example, and films of the Ta alloy layer 140 are formed so as to have 1 nm, 3 nm, 6 nm, 10 nm, and 13 nm in the first example, a twelfth example, the second example, a thirteenth example, and a fourteenth example, respectively.

With reference to FIG. 5, in comparison between the eleventh example and the fourth comparative example, significant improvements in Δθ50, the overwrite characteristic, and SNR can be seen. Therefore, it can be seen that the Ta alloy layer 140 has a significant effect even when its film is formed to have 1 nm. As the thickness of the Ta alloy layer 140 is increased as 3 nm and 6 nm, the characteristics are further improved. However, with 6 nm as a peak of the SNR, if the thickness is increased more, the characteristics are degraded. In the fourteenth comparative example with 13 nm, the characteristics are approximately the same as those in the fourth comparative example. The reason for this can be thought such that when the thickness of the Ta alloy layer 140 is increased to some degree, AFC coupling of the soft magnetic layer is weakened to increase noise. From this, it has been confirmed that the film thickness of the Ta alloy layer 140 is preferably equal to or larger than 1 nm and equal to or smaller than 10 nm.

In the foregoing, the preferred embodiments of the present invention have been described with reference to the attached drawings. Needless to say, however, the present invention is not restricted to these embodiments. It is clear that the person skilled in the art can conceive various modification examples or corrected examples within a range described in the scope of claims for patent, and it is understood that they reasonably belong to the technological scope of the present invention.

INDUSTRIAL APPLICABILITY

The present invention can be used as a perpendicular magnetic disk implemented on an HDD of a perpendicular magnetic recording type or the like and its manufacturing method.

DESCRIPTION OF REFERENCE NUMERALS

100 . . . perpendicular magnetic disk, 110 . . . base, 120 . . . adhesion layer, 130 . . . soft magnetic layer, 132 . . . first soft magnetic layer, 134 . . . spacer layer, 136 . . . second soft magnetic layer, 140 . . . Ta alloy layer, 142 . . . Ni alloy layer, 150 . . . ground layer, 160 . . . granular magnetic layer, 170 . . . dividing layer, 180 . . . auxiliary recording layer, 190 . . . protective layer, 200 . . . lubricating layer

The invention claimed is:

1. A perpendicular magnetic disk comprising:
on a base,
a soft magnetic layer comprising a first soft magnetic layer, a second soft magnetic layer and a spacer layer, the first and second soft magnetic layers comprising a Fe—Co-base alloy containing 1 atomic percent or more to 5 atomic percent or less Ta, the spacer layer being interposed between the first and second soft magnetic layers and made of Ru;
a Ta alloy layer provided on the second soft magnetic layer, the Ta alloy layer being formed by having Ta contained in a Fe—Co-base alloy or a Fe—Ni base alloy and containing 15 atomic percent or more and 40 atomic percent or less Ta, the Ta alloy layer having amorphous and soft magnetic properties and a film thickness of 1 nm to 10 nm;
an Ni alloy layer provided on the Ta alloy layer;
a ground layer provided on the Ni alloy layer and having Ru as a main component; and
a granular magnetic layer provided on the ground layer, wherein the Ta alloy layer is in contact with the second soft magnetic layer.

2. The perpendicular magnetic disk according to claim 1, wherein the Ta alloy layer contains more than 16 atomic percent and 25 atomic percent or less Ta.

3. The perpendicular magnetic disk according to claim 1, wherein the film thickness of the Ta alloy layer is 1-3 nm.

4. The perpendicular magnetic disk according to claim 1, wherein the film thickness of the Ta alloy layer is 3-6 nm.

5. The perpendicular magnetic disk according to claim 1, wherein the FeCo-base alloy in the first and second soft magnetic layers contains 1 atomic percent or more to 3 atomic percent or less Ta.

6. The perpendicular magnetic disk according to claim 1, wherein the Ni alloy layer comprises an alloy having Ni as a main component and having added thereto at least one of V, Cr and Mo.

7. The perpendicular magnetic disk according to claim 1, wherein the Ni alloy layer comprises an alloy having Ni as a main component and having added thereto V.

* * * * *